H. F. Shaw.
Differential Gear-Power Machine.
Nº 75304. Patented Mar. 10, 1868.
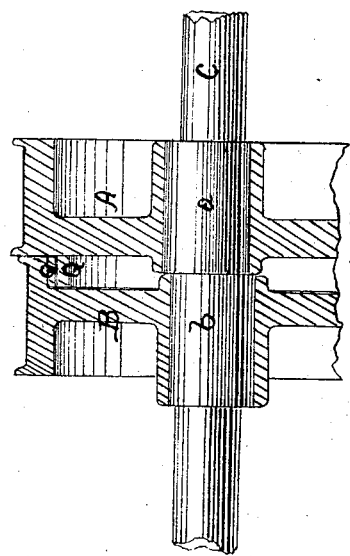
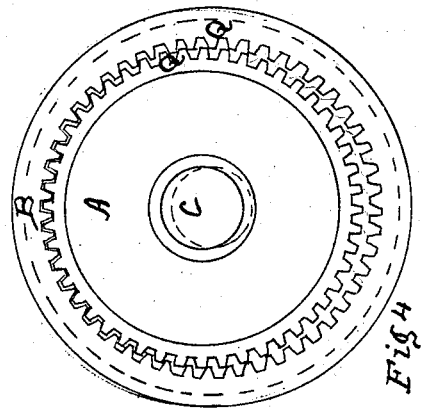
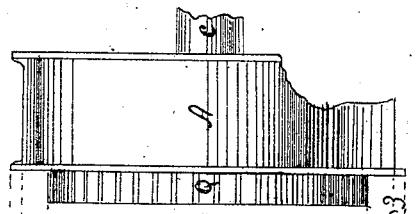
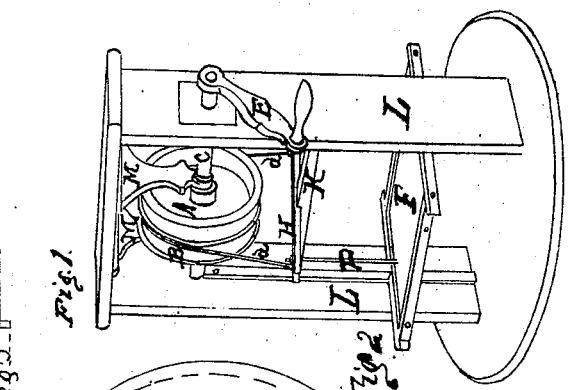
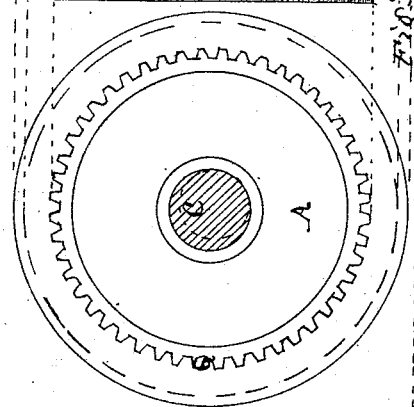
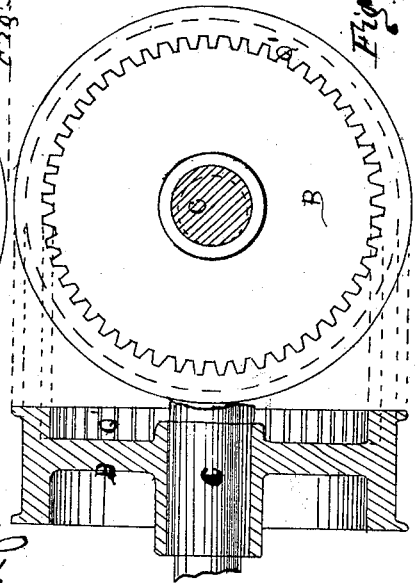
Henry F Shaw, Inventor.
Witnesses: A. Hun Berry, Frank L. Parker.

United States Patent Office.

HENRY FRANKLIN SHAW, OF WEST ROXBURY, MASSACHUSETTS.

Letters Patent No. 75,304, dated March 10, 1868.

IMPROVEMENT IN DIFFERENTIAL GEAR-POWER MACHINE.

The Schedule referred to in these Letters Patent and making part of the same.

TO ALL WHOM IT MAY CONCERN:

Be it known that I, HENRY FRANKLIN SHAW, of West Roxbury, in the county of Norfolk, in the State of Massachusetts, have invented a new and improved Differential Gear-Power Machine; and I do hereby declare that the following is a full and exact description thereof, reference being had to the accompanying drawings and to the letters of reference marked thereon.

The nature of my invention consists in greatly simplifying and improving that class of power-multiplying machines known as differential gear. It is well known to mechanics that if a cylinder, having spur-gear cut upon its external surface, be made to roll upon spur-gear cut upon the internal surface of a second cylinder, the relative rotatory motion of the two cylinders will depend upon the difference of the relative diameters of the two pitch lines. Thus, if the two pitch lines are identical, the two will have no relative rotatory motion; if they revolve at all, they must both revolve with the same velocity. If we make the pitch line of one smaller than that of the other, and give one of the gears a motion around a central point, but still so confining it as not to admit of a rotatory motion on its own axis, it will be found that the other gear will be forced to revolve with a velocity that holds the same relation to the velocity with which the actuating gear moves, as a mass, around its central motion, that the difference between the diameters of the pitch lines bears to the diameter of the larger pitch line.

An invention made by me, and described in patent dated May 21, 1867, and numbered 64,415, works upon the principle above set forth. By my present invention, I hang both these gears eccentrically upon a shaft, which is free to revolve independently of either gear. The gears themselves are also free to revolve around their own axis, but are hung eccentrically upon the free revolving shaft. Now, if one of these gears is held, and the shaft be made to revolve, it will be found that the unconfined gear will have a slow motion around its own centre. Again, if the motion of both of these gears is resisted by an equal force, it will be found that they will revolve slowly in opposite directions. I take advantage of this principle, by attaching two ropes to the weight to be lifted or resistance to be overcome, and connecting these ropes, one to a pulley connected with one gear, and the other to a pulley connected with the other gear, so that when the central shaft is made to revolve, the pulleys act mutually as buttresses for each other, and thus overcome any resistance offered to their tendency to relative motion. As both pulleys are free upon the actuating-shaft, and as the two ropes draw upon opposite sides, a perfect equilibrium of tension upon each rope is maintained. In the drawings—

Figure 1 represents a perspective view of my invention when used as a hoisting-gear of an elevator.
Figure 2 represents a combined pulley and internal gear in plan and section.
Figure 3 represents a combined pulley and external gear.
Figure 4 is a section through both gears.
Figure 5 represents the actuating-shaft.

L L, fig. 1, represent the two standards or supporting-posts of an elevator, in which is hung the actuating-shaft C, shown enlarged in fig. 5. E is a crank for turning the actuating-shaft. M M, fig. 1, are hangers for the purpose of giving additional support to the shaft C. F P K, fig. 1, represent the platform and frame of the elevator-carriage. H is a cross-bar attached to the upper bar K of the frame of the carriage. $d\ d'$ are two cords attached to the ends of the bar H, and to the pulleys A B.

The pulleys A B are made as represented in figs. 2 and 3, that is, the pulley A is provided with an external spur-gear, Q, fig. 3, while the pulley B is provided with an internal spur-gear, Q', fig. 2. When in use these two gears and pulleys are placed together, as shown in figs. 4 and 5, and hung on the shaft C, the pulley A on the eccentric, $a$, and the pulley B on the eccentric, $b$.

By a careful examination of the drawings and above description, it will be understood that if the shaft C be revolved, and if an equal resistance be offered to the revolution of the two pulleys, that is, such a resistance as would be offered by the two cords $d\ d'$, fig. 1, a differential motion will take place between them, and in case the shaft is turned in the right direction, the weight will be raised, but if turned in the opposite direction, the weight will be lowered.

Since the cords $d\ d'$ pull from opposite sides of the shaft C, and the gears connected by the two pulleys always mesh together, there will be perfect equilibrium of strain upon the two cords, that is, one will act exactly against the other, and there will be no tendency of the weight to run down; hence in my apparatus I require no pawls or brakes to hold the weight when partly raised.

The necessary relative eccentric motion can be obtained by a single eccentric on the shaft C, but the machine does not look so well in operation.

Having thus described my invention, I will now set forth my claim.

What I claim as my invention, and desire to secure by Letters Patent of the United States, is—

The two pulleys or winding-barrels in the differential gear-power machine, connected by gear as described, eccentrically hung upon a free revolving actuating-shaft, operating substantially as described, and for the purpose set forth.

HENRY F. SHAW.

Witnesses:
WILLIAM EDSON,
A. HUN BERRY.